United States Patent
Amerige et al.

(10) Patent No.: US 10,657,322 B2
(45) Date of Patent: May 19, 2020

(54) SYSTEMS AND METHODS TO OPTIMIZE ACQUISITION OF TEMPLATES FOR CONTENT ITEMS IN NEWS FEED

(71) Applicant: Facebook, Inc., Menlo Park, CA (US)

(72) Inventors: Brian Daniel Amerige, Menlo Park, CA (US); Tirunelveli R. Vishwanath, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 696 days.

(21) Appl. No.: 14/931,111

(22) Filed: Nov. 3, 2015

(65) Prior Publication Data

US 2017/0124061 A1 May 4, 2017

(51) Int. Cl.
| | |
|---|---|
| *G06F 40/186* | (2020.01) |
| *H04L 29/06* | (2006.01) |
| *G06F 40/14* | (2020.01) |
| *G06F 40/197* | (2020.01) |
| *G06Q 50/00* | (2012.01) |

(52) U.S. Cl.
CPC ............ *G06F 40/186* (2020.01); *G06F 40/14* (2020.01); *G06F 40/197* (2020.01); *H04L 67/42* (2013.01); *G06Q 50/01* (2013.01)

(58) Field of Classification Search
CPC .................................................. G06F 17/248
USPC ....................................................... 715/204
See application file for complete search history.

(56) References Cited

U.S. PATENT DOCUMENTS

| | | | | |
|---|---|---|---|---|
| 6,560,604 | B1 * | 5/2003 | Fascenda | G06F 9/44505 707/999.01 |
| 6,928,433 | B2 * | 8/2005 | Goodman | G06F 3/0482 |
| 6,934,749 | B1 * | 8/2005 | Black | G06F 1/14 709/217 |
| 7,739,310 | B1 * | 6/2010 | Shmulevich | G06F 16/958 707/802 |
| 7,930,273 | B1 * | 4/2011 | Clark | G06F 8/71 707/638 |
| 8,302,013 | B2 * | 10/2012 | Garcia | G06F 16/958 715/743 |
| 10,002,005 | B2 * | 6/2018 | Corbin | G06F 3/04842 |
| 10,067,930 | B2 * | 9/2018 | Ying | G06F 17/211 |
| 10,291,674 | B1 * | 5/2019 | Pierson | H04L 67/06 |
| 10,419,311 | B2 * | 9/2019 | Laribi | H04L 41/0843 |
| 2002/0143822 | A1 * | 10/2002 | Brid | G06F 17/30905 |

(Continued)

OTHER PUBLICATIONS

Tatsubori et al., "HTML Templates that Fly, a Template Engine Approach to Automated Offloading from Server to Client," 2009 available at: http://citeseerx.ist.psu.edu/viewdoc/download?doi=10.1.1.215.6502&rep=rep1&type=pdf (Year: 2009).*

(Continued)

*Primary Examiner* — Andrew R Dyer
(74) *Attorney, Agent, or Firm* — Sheppard Mullin Richter & Hampton LLP

(57) ABSTRACT

Systems, methods, and non-transitory computer readable media are configured to maintain a plurality of templates that specify presentation of types of content items in a news feed, each template of the plurality of templates having an identifier. An identifier of a template associated with a content item to be presented in the news feed is received. It is determined whether the identifier of the template associated with the content item matches an identifier of a template of the plurality of templates.

13 Claims, 7 Drawing Sheets

(56) References Cited

U.S. PATENT DOCUMENTS

| | | | |
|---|---|---|---|
| 2004/0010598 A1* | 1/2004 | Bales | G06F 9/451 709/228 |
| 2004/0068554 A1* | 4/2004 | Bales | G06F 3/0481 709/218 |
| 2004/0205609 A1* | 10/2004 | Milton | G06F 16/9535 715/248 |
| 2005/0119871 A1* | 6/2005 | Deffler | G06F 8/24 703/22 |
| 2006/0092861 A1* | 5/2006 | Corday | H04L 41/0213 370/256 |
| 2007/0089053 A1* | 4/2007 | Uhlig | G06F 17/212 715/255 |
| 2007/0245235 A1* | 10/2007 | Singh | G06F 16/275 715/209 |
| 2009/0100371 A1* | 4/2009 | Hu | G06O 10/06 715/780 |
| 2011/0202966 A1* | 8/2011 | Gupta | H04N 7/173 725/114 |
| 2013/0145257 A1* | 6/2013 | Shalabi | G06F 17/248 715/243 |
| 2016/0026611 A1* | 1/2016 | Liu | G06F 17/218 715/234 |
| 2016/0055140 A1* | 2/2016 | McKenzie | G06F 17/246 715/212 |
| 2016/0092404 A1* | 3/2016 | Farouki | G06F 9/451 715/202 |
| 2016/0212168 A1* | 7/2016 | Dotan | H04L 63/20 |
| 2017/0076295 A1* | 3/2017 | Vasudev | G06Q 30/016 |

OTHER PUBLICATIONS

GitHub, "Template file is json and hence doesnt have support forcomments. #283," 2013 available at: https://github.com/hashicorp/packer/issues/283 (Year: 2013).*

* cited by examiner

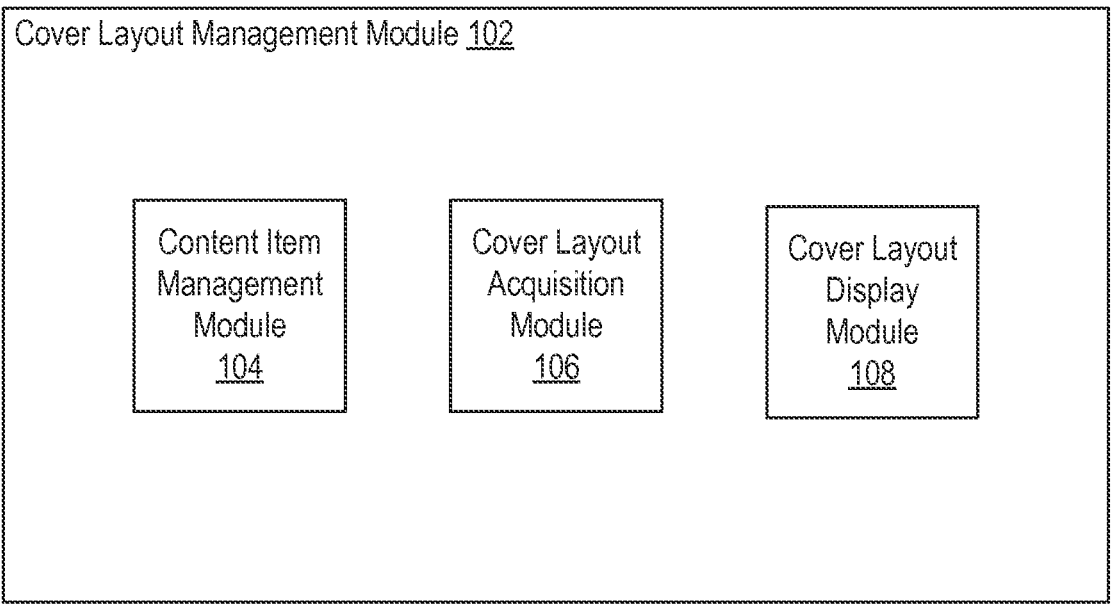
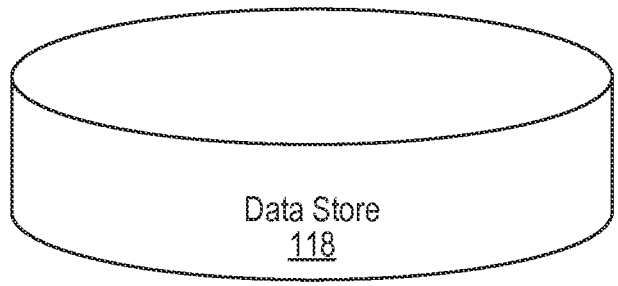
FIGURE 1

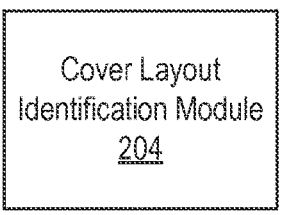
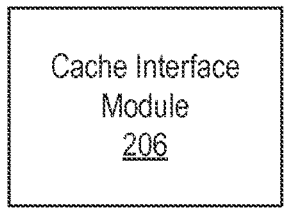
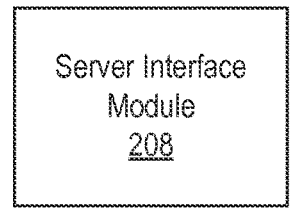
FIGURE 2

400

```
┌─────────────────────────────────────────────────────────────────────┐
│ Maintain a plurality of templates that specify presentation of types│
│ of content items in a news feed, each template of the plurality of  │
│ templates having an identifier                                      │
│ 402                                                                 │
└─────────────────────────────────────────────────────────────────────┘
                                   │
                                   ▼
┌─────────────────────────────────────────────────────────────────────┐
│ Receive an identifier of a template associated with a content item  │
│ to be presented in the news feed                                    │
│ 404                                                                 │
└─────────────────────────────────────────────────────────────────────┘
                                   │
                                   ▼
┌─────────────────────────────────────────────────────────────────────┐
│ Determine whether the identifier of the template associated with the│
│ content item matches an identifier of a template of the plurality   │
│ of templates                                                        │
│ 406                                                                 │
└─────────────────────────────────────────────────────────────────────┘
```

Store in a cache of a client computing device a plurality of templates that specify presentation of types of content items in a news feed, each template of the plurality of templates having an identifier
502

Receive an identifier of a template associated with a content item to be presented in the news feed
504

Determine whether the identifier of the template associated with the content item matches an identifier of a template of the plurality of templates
506

Obviate communication of a request for the template to a server system when the identifier of the template associated with the content item matches an identifier of a template of the plurality of templates stored in the cache
508

Parse the template to present the content item in the news feed
510

FIGURE 5

SYSTEMS AND METHODS TO OPTIMIZE ACQUISITION OF TEMPLATES FOR CONTENT ITEMS IN NEWS FEED

FIELD OF THE INVENTION

The present technology relates to the field of content provision. More particularly, the present technology relates to techniques for optimizing acquisition of templates to present content in a networked environment.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content can be shared in a variety of manners. One example of a technique to share content with a user in a social network is a news feed. The news feed can be a listing of content items (or stories) that are deemed appropriate for presentation to the user. The news feed for the user can include myriad types of content items. Such content items can include, for example, images uploaded by others in the social network of the user, descriptions of activities of connections of the user, articles regarding subject matter of interest to the user, advertisements directed to the user, etc. When content items are generated by prolific or professional publishers of content, the content items and their design can be presented in the news feed in accordance with the preferences of the publishers.

SUMMARY

Various embodiments of the present disclosure can include systems, methods, and non-transitory computer readable media configured to maintain a plurality of templates that specify presentation of types of content items in a news feed, each template of the plurality of templates having an identifier. An identifier of a template associated with a content item to be presented in the news feed is received. It is determined whether the identifier of the template associated with the content item matches an identifier of a template of the plurality of templates.

In an embodiment, the identifier of the template associated with the content item includes an identification reference and a version number.

In an embodiment, the types of content items includes at least one of a type of content items having text, a type of content items having a photo, and a type of content items having a video.

In an embodiment, the computing system is a client computing device. Maintaining the plurality of templates further comprises storing the plurality of templates and associated identifiers in a cache of the client computing device.

In an embodiment, communication of a request for the template to a server system is obviated based on a match between the identifier of the template associated with the content item and an identifier of a template of the plurality of templates stored in the cache. The template is parsed to present the content item in the news feed.

In an embodiment, a request for the template to a server system is provided based on an absence of a match between the identifier of the template associated with the content item and an identifier of a template of the plurality of templates stored in the cache.

In an embodiment, the template is received from the server system.

In an embodiment, the template is parsed to present the content item in the news feed.

In an embodiment, the template is stored in the cache of the client computing system.

In an embodiment, the template is designed in a JSON DSL.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates a system including an example cover layout management module, according to an embodiment of the present disclosure.

FIG. 2 illustrates an example cover layout acquisition module, according to an embodiment of the present disclosure.

FIG. 4 illustrates a first method to acquire a cover layout, according to an embodiment of the present disclosure.

FIG. 5 illustrates a second method to acquire a cover layout, according to an embodiment of the present disclosure.

Figure 3:
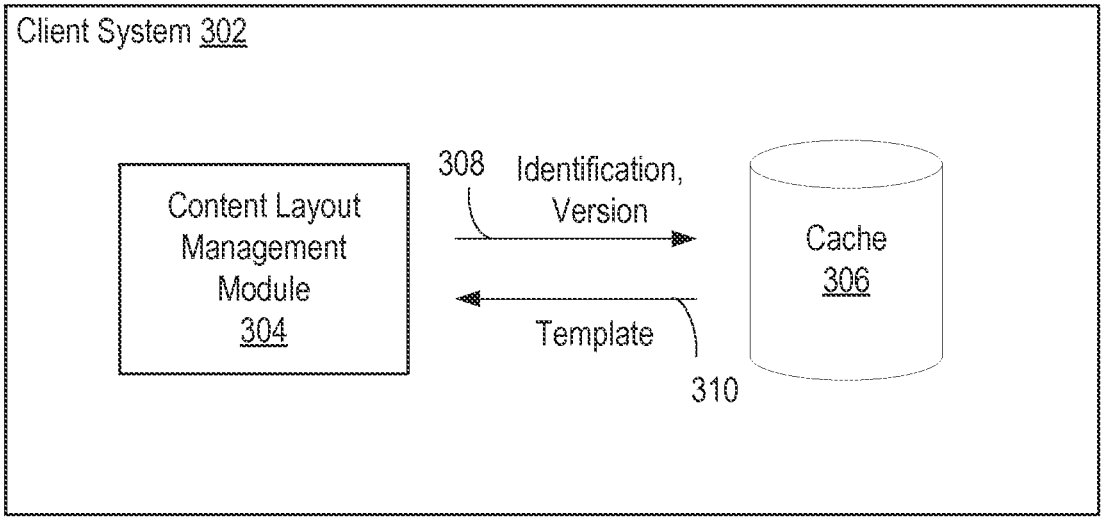
FIG. 3 illustrates an example functional diagram of cover layout acquisition, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Managing Cover Layouts for Content Items in a News Feed

A news feed can be an effective technique to present content items (or stories) to a user. In some instances, a news feed can constitute an ordered listing of content items presented for the user to stay apprised of events in his or her social network. The news feed for the user can include various types of content items. The content items can include, for example, images uploaded by others in a social network of the user, accounts of activities of connections of the user, articles regarding subject matter of interest to the user, advertisements directed to the user, etc. The amount of content items presented to the user can increase as the social network of the user swells, the interests of the user grow more varied, and the interactions of the user expand. As mentioned, content items in some instances can be generated by prolific or professional publishers of content. In such instances, a social networking system providing a platform for the social network can allow the publishers to specify their preferences with respect to presentation of their content items. In particular, the publishers can sometimes specify the appearance of their content items as they appear in the news feed of users of the social networking system.

However, the ability of publishers to design the appearance of content items that they publish in a news feed of a social networking system is limited. Conventional techniques can accommodate the design preferences of only a relatively small number of publishers. For a social networking system experiencing large growth in the number of publishers posting content, the inability to accommodate more publishers and their preferences for the presentation of their content items in the news feed can negatively impact the user experience of the publishers. Further, even if the social networking system can accommodate a limited number of publishers, conventional techniques still cannot manage and implement the entire spectrum of design preferences of these publishers for their diverse types of content items. Rather, conventional techniques in many instances are limited to maintaining only a single static template on the client side for controlling the presentation of the content item, no matter the type of the content item. A publisher is accordingly provided with no ability to supplement the static template with improved designs or other templates reflecting new designs to tailor presentation of different types of content items. As a result, conventional techniques can impede the publisher in its attempts to provide optimal presentation of its content items according to a full spectrum of design preferences. In addition, a user on the social networking system who has access to the content items is prevented from experiencing their optimal presentation and, worse yet, may choose therefore not to fully consume the content item at all.

An improved approach rooted in computer technology to manage cover layouts for content items in a news feed in connection with a social networking system overcomes these and other disadvantages associated with conventional approaches implemented in computer technology. Systems, methods, and computer readable media of the present technology can receive metadata associated with content items identified by a news feed algorithm to select content items for presentation to a user of the social networking system. The content items can be provided by publishers for publication on the social networking system. An identifier and a version number as part of the metadata can be assigned for a cover layout, which constitutes a template for the presentation of the content item in the news feed. In some instances, the template can be designed with a custom JSON DSL (domain specific language). Based on the identifier and the version number of a template associated with a content item, a client computing device can perform a check to determine whether the associated template is already stored in a cache of the client computing device. If so, the template can be retrieved and parsed to generate a layout specification that defines how to layout the content item. If the template is not already stored in the cache, the client computing device can communicate with a server of the social networking system to download the template based on the identifier and the version number of the template and cache the template. The client computing device can display the layout specification and load the media associated with the content item. More details regarding the present technology are discussed herein.

Figure 6:
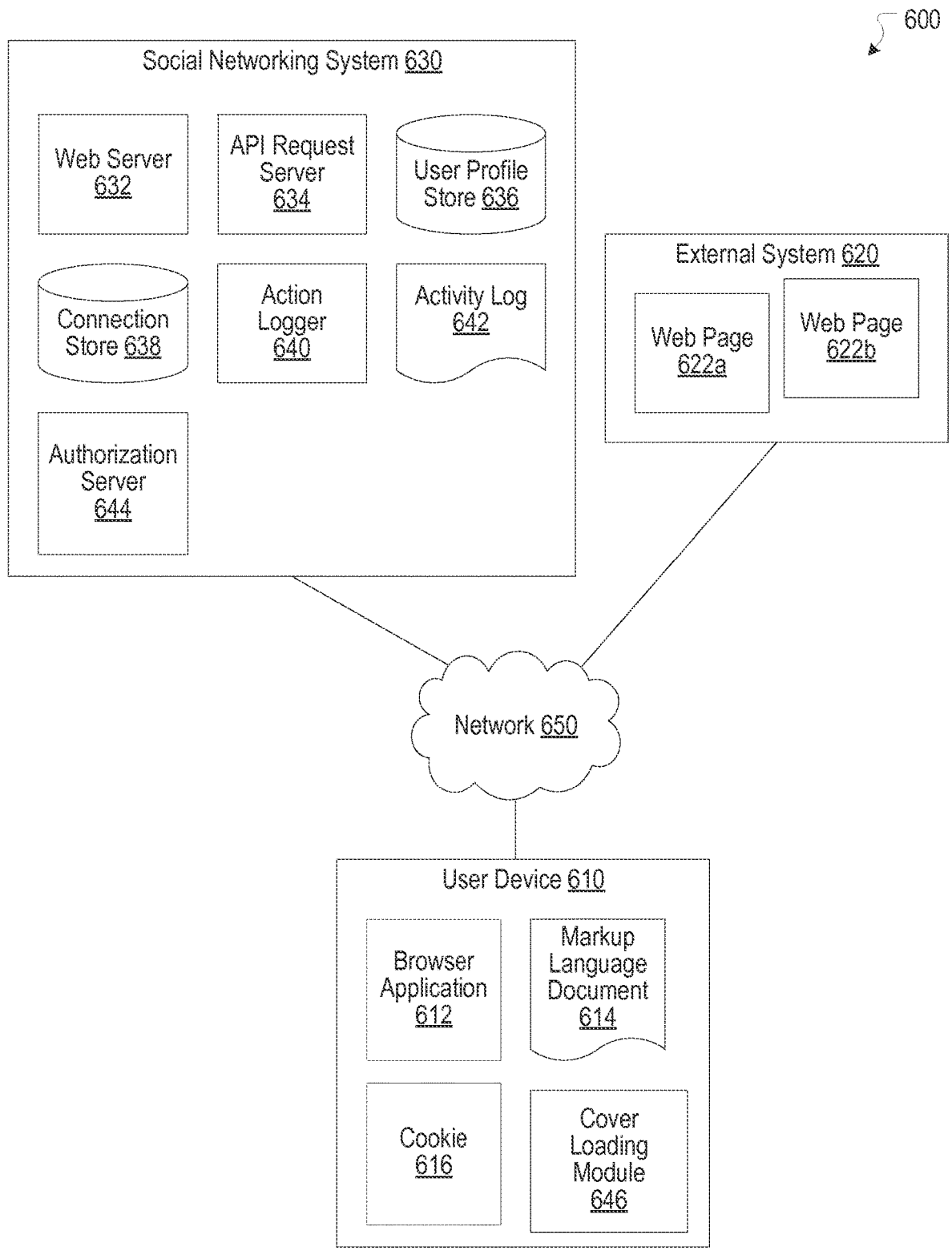
FIG. 6 illustrates a network diagram of an example system that can be utilized in various scenarios, according to an embodiment of the present disclosure.

FIG. 1 illustrates an example system 100 including an example cover layout management module 102 configured to display content items in a news feed based on templates, according to an embodiment of the present disclosure. In some embodiments, the news feed can be supported by a social networking system and the publishers can provide content items for publication to users on the social networking system. In some embodiments, the cover layout management module 102 can be implemented as or in an application supported by the social networking system and running on a client computing device, such as a user device 610 as shown in FIG. 6 as discussed in more detail herein.

The cover layout management module 102 can include a content item management module 104, a cover layout acquisition module 106, and a cover layout display module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the cover layout management module 102 can be implemented in any suitable combinations.

The content item management module 104 can receive metadata associated with content items identified from a news feed algorithm to select content items for presentation to a user in a news feed supported by the social networking system. The news feed algorithm can include a technique to identify relevant content items for all users of a social networking system. In one implementation, the news feed algorithm can train (and retrain) machine learning models for ranking content items for potential presentation in news feeds of users of a social networking system. For example, the news feed algorithm can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them.

In accordance with the news feed algorithm, features used to train the models can include interactions of users with content items of a news feed. Such interactions can include, for example, selecting a link in the content item, commenting on the content item, liking the content item, and hiding the content item. The news feed algorithm can use the models for each set of users to determine levels of interest of a user in topics reflected by content items. The level of interest of a user in each topic can be indicated by a topic score. The social networking system can rank a content item for potential presentation to a user based on a topic(s) reflected by the content item and the topic score(s) of the user for the topic(s). In some instances, an aggregate score can be determined for the user in connection with each content item overall, and the content items can be ranked based on their aggregate scores. Content items having a ranking that satisfies a selected threshold value can be ultimately presented to the user in his or her news feed.

Each content item can be associated with metadata to facilitate its display in a news feed on computing devices associated with users. The metadata can include information associated with a particular cover layout determined by one or more of a publisher, an administrator of the social networking system, or any other designer of content items for display in the news feed. The cover layout can be a template for the presentation of the content item in the news feed. The template can specify relevant information and details regarding appearance and design of the content item for display in the news feed. In one embodiment, the template can specify the following types of information:

Text (headline, description, author byline)
    Color
    Word Kerning (space between words)
    Line Height
    Font Size
    Font Family
    Horizontal Position
        Left
        Right
        Center
        LeftOf (relative to another element)
        RightOf (relative to another element)
        CenteredIn (relative to another element)
    Vertical Position
        Top
        Bottom
        BaseAboveGridline (a number of gridlines to position the element below)
        CenteredInGridline (a number of gridlines to position half of the element above, half below)
        Above (relative to another element)
        Below (relative to another element)
        CenteredIn (relative to another element)
    Horizontal/Vertical Constraints
        Exact (an exact point-value)
        Max (sized to fit, with this maximum clamping value)
Non Text
    Source Image (e.g., the publisher's logo)
    Cover Media (e.g., a photo or a video)
    Byline Area (a rectangle that contains the byline)
    Bars (e.g., red border above the byline area)
    Overlays (e.g., a partially transparent white overlay on top of the cover image, behind the headline text)

In other embodiments, a template can specify the same or different types of information in a similar or different manner. In some instances, the template can be designed with a custom JSON DSL (domain specific language).

Publishers may publish different types of content items. Accordingly, a designer can provide a different template for each type of content item to optimize the presentation of that type of content item in the news feed. For example, one type of content item that can be provided by a publisher can contain only text. As a result, the designer may specify a particular template for presentation of this type of content item that contains only text. As another example, another type of content item that can be provided by a publisher can contain only images. As a result, the designer may specify a different particular template for presentation of this type of content item that contains only images. As yet another example, another type of content item that can be provided by a publisher can contain only video. As a result, the designer may specify a different particular template for presentation of this type of content item that contains only video. As yet still another example, another type of content item that can be provided by a publisher can contain both text and images. As a result, the designer may specify a different particular template for presentation of this type of content item that contains both text and images. As yet another example, another type of content item that can be provided by a publisher can contain both text and video. As a result, the designer may specify a different particular template for presentation of this type of content item that contains both text and video. In this manner, any number of different templates can be provided by a designer based on different types of content items and optimal presentation of the each type of content item.

Each template can be associated with a unique identifier, such as an identification reference. In some embodiments, the identification reference can be a string. For example, the string can identify the publisher and the template associated with a particular type of content item. In other embodiments, the identification reference can be any suitable value or number. A template can be originally developed and then iteratively improved. The original form of the template can be considered a first version of the template. Each subsequent improvement of a template can be considered a later version of the template. Each version of a template can be associated with an identifier, such as a version number. Accordingly, a template can be uniquely identified by an identification reference and a version number.

The content item management module 104 can receive the metadata associated with each content item, including an identification reference and a version number to identify a particular template for presentation of the content item. The metadata, including the identification reference and the version number, can be provided from a server operated by the social networking system to the content item management module 104. The content item management module 104 can provide the identification reference and the version number to the cover layout acquisition module 106.

The cover layout acquisition module 106 can receive the identification reference and the version number of a template associated with a content item for presentation in the news feed. The cover layout acquisition module 106 can acquire the template based on the identification reference and the version number. The cover layout acquisition module 106 is discussed in more detail herein.

The cover layout display module 108 can display the content item based on the associated template for the content item. The template can be provided by the cover layout acquisition module 106 to the cover layout display module 108. In one example, a template in JSON associated with a content item for display in a news feed can be specified as follows:

```
{
  "id": "com.facebook.publisherxArticle",
  "layoutSpecVersion": "0.1",
  "deviceFamily": "phone",
  "border": { },
  "coverImage": {
    "verticalPosition": "top_flush",
    "verticalConstraint": "exact:6grid+padding",
    "horizontalPosition": "left_flush",
    "horizontalConstraint": "exact:full_width",
    "showBorder": true
  },
  "headline": {
    "horizontalPosition": "left",
    "verticalPosition": "below:bar+10pt",
    "horizontalConstraint": "max:11grid",
    "fontFamily": "Georgia",
    "maxFontSize": 16.0,
    "maxLineHeight": 19.0,
    "maxWordKerning": −0.5,
    "maxColor": "#2a2a2a",
    "minFontSize": 25.0,
```

-continued

```
"minLineHeight": 27.0,
"minWordKerning": −0.5,
"minColor": "#2a2a2a"
},
"description": {
"horizontalPosition": "left",
"verticalPosition": "below:headline+10pt",
"verticalConstraint": "bottom",
"horizontalConstraint": "max:12grid",
"fontFamily": "Georgia",
"maxFontSize": 10.0,
"maxLineHeight": 12.0,
"minWordKerning": −0.5,
"maxColor": "#4d4d4d"
},
"bylineArea": {
"verticalPosition": "below:coverImage",
"verticalConstraint": "exact:26pt"
},
"byline": {
"horizontalPosition": "right",
"verticalPosition": "centered_in:bylineArea",
"horizontalConstraint": "right_of:sourceImage+8pt",
"morphAlignment": "right",
"fontFamily": "HelveticaNeue-Medium",
"maxFontSize": 8.0,
"maxLineHeight": 9.0,
"maxWordKerning": 0.0,
"maxColor": "#656565",
"minFontSize": 10.0,
"minLineHeight": 12.0,
"minWordKerning": −0.1,
"minColor": "#656565"
},
"sourceImage": {
"horizontalPosition": "left",
"verticalPosition": "centered_in:bylineArea+1pt"
},
"bars": [{
"id": "bar",
"horizontalPosition": "left",
"verticalPosition": "below:bylineArea−1pt",
"horizontalConstraint": "exact:12grid",
"verticalConstraint": "exact:0.5pt",
"color": "#cbcbcb"
}]
}
```

The cover layout display module 108 can parse the template to generate a layout specification that defines how to layout the content item. The cover layout display module 108 can display the layout specification and can load the media (e.g., image, video, etc.) associated with the content item so that the content item is displayed in the news feed.

In some embodiments, the cover layout management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the cover layout management module 102 can be, in part or in whole, implemented as software running on one or more computing devices or systems, such as on a client computing device or a server. For example, the cover layout management module 102 can be implemented as or within a dedicated application (e.g., app), a program, or an applet running on a user computing device or client computing system. In some instances, the cover layout management module 102 can be, in part or in whole, implemented within or configured to operate in conjunction or be integrated with a social networking system (or service), such as a social networking system 630 of FIG. 6. Likewise, in some instances, the cover layout management module 102 can be, in part or in whole, implemented within or configured to operate in conjunction or be integrated with client computing device, such as the user device 610 of FIG. 6. It should be understood that many variations are possible.

The data store 118 can be configured to store and maintain various types of data, such as the data relating to support of and operation of the cover layout management module 102. The data can include data relating to, for example, templates for various types of content items, identification references and version numbers associated with the templates, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the cover layout management module 102 can be configured to communicate and/or operate with the data store 118. In some embodiments, the data store 118 can be a cache within a client computing device. In some embodiments, the data store 118 can be a data store of a server system in communication with the client computing device.

FIG. 2 illustrates an example cover layout acquisition module 202, according to an embodiment of the present disclosure. In some embodiments, the cover layout acquisition module 106 of FIG. 1 can be implemented with the cover layout acquisition module 202. As shown in the example of FIG. 2, the cover layout acquisition module 202 can include a cover layout identification module 204, a cache interface module 206, and a server interface module 208.

The cover layout identification module 204 can receive the identification reference and the version number of the template associated with the content item to be presented in the news feed. Based on the identification reference and the version number of the template, the cover layout identification module 204 can interact with the cache interface module 206 and the server interface module 208 to acquire the template.

The cover layout identification module 204 can communicate with the cache interface module 206 to query the cache to determine if the cache already contains the desired template associated with the content item to be presented in the news feed. If an identification reference and a version number of a template in the cache matches the identification reference and the version number of the desired template, the cache can provide the template to the cache interface module 206 and the template can be provided to the cover layout display module 108. If an identification reference and a version number of a template in the cache does not match the identification reference and the version number of the desired template, the cache can provide a null result or other indication of the absence of the desired template to the cache interface module 206.

In response to the indication of the absence of the desired template in the cache, the cover layout identification module 204 can interact with the server interface module 208. The cover layout identification module 204 can communicate with the server interface module 208 to query a data store associated with a server operated by the social networking system to determine if the data store maintains the desired template. If an identification reference and a version number of a template in the data store matches the identification reference and the version number of the desired template, the server can provide the template to the server interface module 208 and the template can be provided to the cover layout display module 108.

FIG. 3 illustrates an example simplified functional block diagram 300 that illustrates a scenario for acquiring a template associated with a content item to be presented in a news feed, according to an embodiment of the present disclosure. A client system 302 can include a cover layout management module 304 for managing presentation of a news feed on the client system 302. The client system 302 can include a cache 306. The cache 306 can contain templates recently used to present content items in a news feed. The client system 302 can communicate with a server system 310. The server system 310 can include a data store 312. The data store 312 can include templates for content items to be published in news feeds of users of a social networking system. The templates may be specified by designers based on a type of content item to be published. A designer can be a publisher of a content item and a social networking system supporting publication of the content item.

In a first example scenario, metadata associated with a current content item is provided to the content layout management module 304 of the client system 302 to facilitate presentation of the content item in a news feed. The metadata includes an identification reference and a version number of a desired template for presenting the current content item. In an action 308, the content layout management module 304 can query the cache 306 based on provision of the identification reference and the version number of the desired template. In an action 310, when an identification reference and a version number of a template in the cache 306 matches the identification reference and the version number of the desired template, the cache 306 can return the desired template to the content layout management module 304 for presentation of the current content item in the news feed. The content layout management module 304 can parse the template and generate a layout specification that defines how to layout the current content item. The current content item can be displayed and any media (e.g., photos, videos, etc.) can be downloaded.

In this example, the desired template can be found in the cache 306 because the desired template was previously provided to the client system 302 by the server system 310 for a previous content item that was presented in the news feed. Because the desired template can be found in the cache 306, a request to the server system 310 for the desired template can be obviated. The availability of the desired template in the cache 306 can increase display speed of the current content item in the news feed and thereby enhance user experience. In some instances, the previous content item can be of the same type as the current content item. In some instances, the current content item and the previous content item can be generated by the same publisher. In other instances, the current content item and the previous content item can be generated by different publishers.

In a second example scenario, metadata associated with a current content item is provided to the content layout management module 304 to facilitate presentation of the current content item in a news feed. The metadata includes an identification reference and a version number of a desired template for presenting the current content item. The content layout management module 304 can query the cache 306 based on provision of the identification reference and the version number of the desired template. When no identification reference and version number of a template in the cache 306 matches the identification reference and the version number of the desired template, the cache 306 can return an indication of the absence of the desired template in the cache 306 to the content layout management module 304. Accordingly, in an action 314, the content layout management module 304 can query the server system 310 based on provision of the identification reference and the version number of the desired template. In an action 316, when an identification reference and a version number of a template in the data store 312 matches the identification reference and the version number of the desired template, the server system 310 can return the desired template to the client system 302 for presentation of the current content item in the news feed. The content layout management module 304 can parse the template and generate a layout specification that defines how to layout the content item. The content item can be displayed and any media (e.g., photos, videos, etc.) can be downloaded.

In this example, the desired template can be found in the data store 312 because the designer of the content item specified to the server system 310 the optimal appearance of the content item at or around the time when the content item was first published to the social networking system. The desired template can be placed into the cache 306 for later retrieval in connection with presentation in a news feed of future content items of a type associated with the desired template.

FIG. 4 illustrates an example method 400 to acquire a template for a content item to be presented in a news feed of a social networking system, according to an embodiment of the present disclosure. It should be appreciated that there can be additional, fewer, or alternative steps performed in similar or alternative orders, or in parallel, in accordance with the various embodiments and features discussed herein unless otherwise stated.

At block 402, the method 400 can maintain a plurality of templates that specify presentation of types of content items in a news feed, each template of the plurality of templates having an identifier. At block 404, the method 400 can receive an identifier of a template associated with a content item to be presented in the news feed. At block 406, the method 400 can determine whether the identifier of the template associated with the content item matches an identifier of a template of the plurality of templates. Other suitable techniques that incorporate various features and embodiments of the present disclosure are possible.

FIG. 5 illustrates an example method 500 to acquire a template for a content item to be presented in a news feed of a social networking system, according to an embodiment of the present disclosure. It should be appreciated that there can be additional, fewer, or alternative steps performed in similar or alternative orders, or in parallel, in accordance with the various embodiments and features discussed herein unless otherwise stated.

At block 502, the method 500 can store in a cache of a client computing device a plurality of templates that specify presentation of types of content items in a news feed, each template of the plurality of templates having an identifier. At block 504, the method 500 can receive an identifier of a template associated with a content item to be presented in the news feed. At block 506, the method 500 can determine whether the identifier of the template associated with the content item matches an identifier of a template of the plurality of templates. At block 508, the method 500 can obviate communication of a request for the template to a server system when the identifier of the template associated with the content item matches an identifier of a template of the plurality of templates stored in the cache. At block 510, the method 500 can parse the template to present the content item in the news feed. Other suitable techniques that incorporate various features and embodiments of the present disclosure are possible.

Social Networking System—Example Implementation

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a cover layout management module 646. The cover layout management module 646 can be implemented with the cover layout management module 102, as discussed in more detail herein. In some embodiments, one or more functionalities of the cover layout management module 646 can be implemented in the user device 610.

Hardware Implementation

Figure 7:
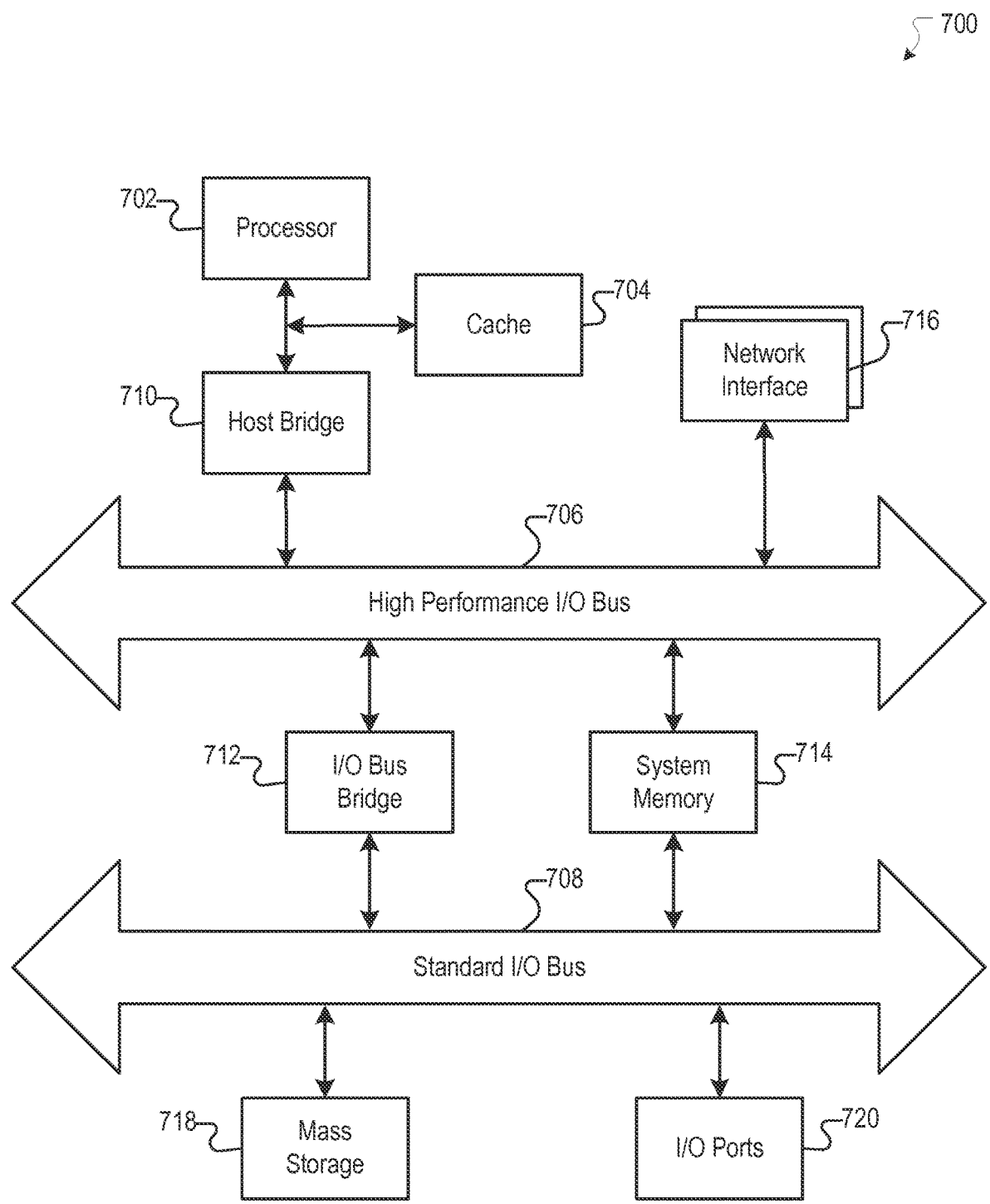
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, at a computing system in communication with a social networking system, a plurality of templates that specify presentation of types of content items in a news feed of the social networking system from one or more publishers different from the social networking system, wherein the computer system is a client computing device;
maintaining, at the computing system, the plurality of templates, each template of the plurality of templates having a template identifier and a template version number;
receiving a content item to be presented in the news feed;
receiving from the social networking system, by the computing system, metadata associated with the content item, wherein the metadata includes a content identifier and a content version number for identifying a particular template to generate a layout for presenting the content item;
determining, by the computing system, that a template identifier of a template in the plurality of templates matches the content identifier of the content item and a template version number of the template matches the content version number provided in the metadata associated with the content item; and
presenting, by the computing system, the content item in a layout determined based at least in part on the determined template.

2. The computer-implemented method of claim 1, wherein the types of content items includes at least one of a type of content items having text, a type of content items having a photo, and a type of content items having a video.

3. The computer-implemented method of claim 1, wherein the maintaining the plurality of templates further comprises:
storing the plurality of templates and associated identifiers in a cache of the client computing device.

4. The computer-implemented method of claim 3, further comprising:
obviating communication of a request for the template to a server system based on a match between the identifier of the template associated with the content item and an identifier of a template of the plurality of templates stored in the cache; and
parsing the template to present the content item in the news feed.

5. The computer-implemented method of claim 1, wherein the template is designed in a domain specific language.

6. A system comprising:
at least one processor; and
a memory storing instructions that, when executed by the at least one processor, cause the system to perform:
receiving, at a computing system in communication with a social networking system, a plurality of templates that specify presentation of types of content items in a news feed of the social networking system from one or more publishers different from the social networking system, wherein the computer system is a client computing device;
maintaining the plurality of templates, each template of the plurality of templates having a template identifier and a template version number;
receiving a content item to be presented in the news feed;
receiving from the social networking system metadata associated with the content item, wherein the metadata includes a content identifier and a content version number for identifying a particular template to generate a layout for presenting the content item;
determining, by the computing system, that a template identifier of a template in the plurality of templates matches the content identifier of the content item and a template version number of the template matches the content version number provided in the metadata associated with the content item; and
presenting, by the computing system, the content item in a layout determined based at least in part on the determined template.

7. The system of claim 6, wherein the types of content items includes at least one of a type of content items having text, a type of content items having a photo, and a type of content items having a video.

8. The system of claim 6, wherein the maintaining the plurality of templates further comprises:
storing the plurality of templates and associated identifiers in a cache of the client computing device.

9. The system of claim 8, further comprising:
obviating communication of a request for the template to a server system based on a match between the identifier of the template associated with the content item and an identifier of a template of the plurality of templates stored in the cache; and
parsing the template to present the content item in the news feed.

10. A non-transitory computer-readable storage medium including instructions that, when executed by at least one processor of a computing system, cause the computing system to perform a method comprising:
receiving, at a computing system in communication with a social networking system, a plurality of templates that specify presentation of types of content items in a news feed of the social networking system from one or more publishers different from the social networking system, wherein the computer system is a client computing device;
maintaining the plurality of templates, each template of the plurality of templates having a template identifier and a template version number;
receiving a content item to be presented in the news feed;
receiving from the social networking system metadata associated with the content item, wherein the metadata includes a content identifier and a content version number for identifying a particular template to generate a layout for presenting the content item;
determining, by the computing system, that a template identifier of a template in the plurality of templates matches the content identifier of the content item and a template version number of the template matches the content version number provided in the metadata associated with the content item; and
presenting, by the computing system, the content item in a layout determined based at least in part on the determined template.

11. The non-transitory computer-readable storage medium of claim 10, wherein the maintaining the plurality of templates further comprises:
storing the plurality of templates and associated identifiers in a cache of the client computing device.

12. The non-transitory computer-readable storage medium of claim 10, wherein the types of content items includes at least one of a type of content items having text, a type of content items having a photo, and a type of content items having a video.

13. The non-transitory computer-readable storage medium of claim 12, further comprising:
- obviating communication of a request for the template to a server system based on a match between the identifier of the template associated with the content item and an identifier of a template of the plurality of templates stored in the cache; and
- parsing the template to present the content item in the news feed.

\* \* \* \* \*